United States Patent [19]
Leisner

[11] Patent Number: 5,862,920
[45] Date of Patent: Jan. 26, 1999

[54] MACHINE TOOL ACCESSORY APPARATUS

[76] Inventor: Jeffery L. Leisner, 7412 26th Ave., Kenosha, Wis. 53143

[21] Appl. No.: 798,190

[22] Filed: Dec. 9, 1996

[51] Int. Cl.$^6$ ........................................................ A47F 5/00
[52] U.S. Cl. ........................ 211/13.1; 211/70.6; 211/168; 312/209
[58] Field of Search ................................ 211/13.1, 70.6, 211/85.13, 96, 168; 312/249.7, 209; 248/282.1

[56] References Cited

U.S. PATENT DOCUMENTS

| | | | |
|---|---|---|---|
| 2,009,485 | 7/1935 | Dodge . | |
| 2,940,809 | 6/1960 | Herzog . | |
| 3,179,255 | 4/1965 | De'Caccia . | |
| 3,271,859 | 9/1966 | Horowitz et al. | 312/209 X |
| 3,817,588 | 6/1974 | Helmers | 312/209 |
| 3,966,052 | 6/1976 | Knaus . | |
| 4,607,897 | 8/1986 | Schwartz | 312/209 |
| 4,930,953 | 6/1990 | Fischer . | |
| 4,930,954 | 6/1990 | Dague . | |
| 4,934,933 | 6/1990 | Fuchs | 312/209 X |
| 4,952,146 | 8/1990 | Doty | 312/209 X |
| 5,103,541 | 4/1992 | Ferletic . | |
| 5,386,915 | 2/1995 | Sirhan . | |
| 5,435,448 | 7/1995 | Kempen . | |
| 5,443,166 | 8/1995 | Schutte et al. . | |
| 5,452,807 | 9/1995 | Foster et al. | 211/168 X |

*Primary Examiner*—Robert W. Gibson, Jr.
*Attorney, Agent, or Firm*—Meroni & Meroni

[57] ABSTRACT

A machine tool accessory apparatus is provided for use with machine tools, such as milling machines. The accessory apparatus is capable of holding a plurality of tooling accessories in an organized manner whereby each accessory is positioned for ready access by a machine tool operator without having the operator move from an operating position of the machine tool. The machine tool accessory apparatus includes a cabinet structure having at least one drawer structure slidably extendible from a front side of the cabinet structure. The cabinet structure includes an upper tray having a plurality of bores of adequate diameter for supporting tool accessories therein. A support arm is provided having first and second ends. The first end is pivotally mounted to the cabinet structure. The second end is pivotally mounted to a mounting structure adapted for mounting immediately adjacent to a sidewall of the machine tool. The support arm extends outwardly from the mounting structure for cantilever positioning the cabinet structure in a spaced apart relationship from the mounting structure. The cabinet structure is movable on the support arm from a first position to a second position with the first side of the cabinet structure in a vertical plane forward of the first position allowing the cabinet structure to be in close proximity to the machine tool operator located in an operating position of the machine tool.

40 Claims, 5 Drawing Sheets

MACHINE TOOL ACCESSORY APPARATUS

BACKGROUND OF THE INVENTION

1. Field of the Invention

The present invention relates generally to storage systems and racks for machine tools. More particularly, the invention pertains to an improved machine tool accessory apparatus adapted to hold collets, precision instruments, and other tooling.

2. Description of the Prior Art

Various prior art storage systems or racks for use with machine tools are known in the art. For example, U.S. Pat. No. 4,930,953 issued to Fischer discloses a storage system for cutting tool collets having a cylindrical drum with a plurality of bored recesses which serve to hold the collets. The drum is mounted on an elongated pin that replaces the normal pivot pin of a milling machine.

U.S. Pat. No. 3,966,052 issued to Knaus discloses a tool holder for holding shank tools in readiness for use on machine tools. The device includes two circular disks having an array of holes to accommodate the shank tools. The disks are rotatable secured to a support arm that secures to a column that is mounted a floor.

While these devices provide a storage system for holding collets or other shank tools, they are limited and do not provide adequate tooling accessories to expedite a wide variety of machine tool set-ups and operations commonly performed on a milling machine, for example.

As will be described in greater detail hereinafter, the apparatus of the present invention differs from those previously proposed and employs a number of novel features that render it highly advantageous over the prior art.

SUMMARY OF THE INVENTION

Accordingly, it is an object of this invention to provide an accessory apparatus to facilitate a machine tool with the most commonly used tools, tooling, and precision instruments to execute a wide range of machine set-ups and operations without the need for the machine operator to leave the machine tool.

Another object of this invention is to provide an accessory apparatus having adequate storage for tooling accessories positioned for ready access by a machine tool operator with only a small amount of movement needed by the operator to access such tooling accessories.

Still another object of this invention is to provide an accessory apparatus that is easy and safe to use in a machine shop and is able to protect the tooling accessories from metal chips or debris and other harmful environmental conditions.

Yet another object of this invention is to provide an accessory apparatus that is durable, economical to manufacture, and will provide a safer environment for the machine tool operator to work in.

To achieve the foregoing and other objectives, and in accordance with the purposes of the present invention a machine tool accessory apparatus is provided for use with machine tools, such as milling machines. The accessory apparatus is capable of holding a plurality of tooling accessories in an organized manner whereby each accessory is positioned for ready access by a machine tool operator without requiring the operator to move from an operating position of the machine tool. The machine tool accessory apparatus includes a cabinet structure having at least one drawer structure slidably extendible from a front side of the cabinet structure. The cabinet structure includes an upper tray having a plurality of bores of adequate diameter for supporting tool accessories therein. A support arm is provided having first and second ends. The first end is pivotally mounted to the cabinet structure. The second end is pivotally mounted to a mounting structure adapted for mounting immediately adjacent to a sidewall of the machine tool. The support arm extends outwardly from the mounting structure for cantilever positioning the cabinet structure in a vertically and horizontally spaced apart relationship from the mounting structure. The cabinet structure is movable on the support arm from a first position with the front side of the cabinet structure in vertical plane generally perpendicular to the sidewall of the machine tool to a second position with the first side of the cabinet structure in a vertical plane forward of the first position allowing the cabinet structure to be in close proximity to the machine tool operator located in an operating position of the machine tool.

Other objects, features and advantages of the invention will become more readily apparent upon reference to the following description when taken in conjunction with the accompanying drawings, which drawings illustrate several embodiments of the invention.

DETAILED DESCRIPTION OF THE PREFERRED EMBODIMENT

Figure 1:
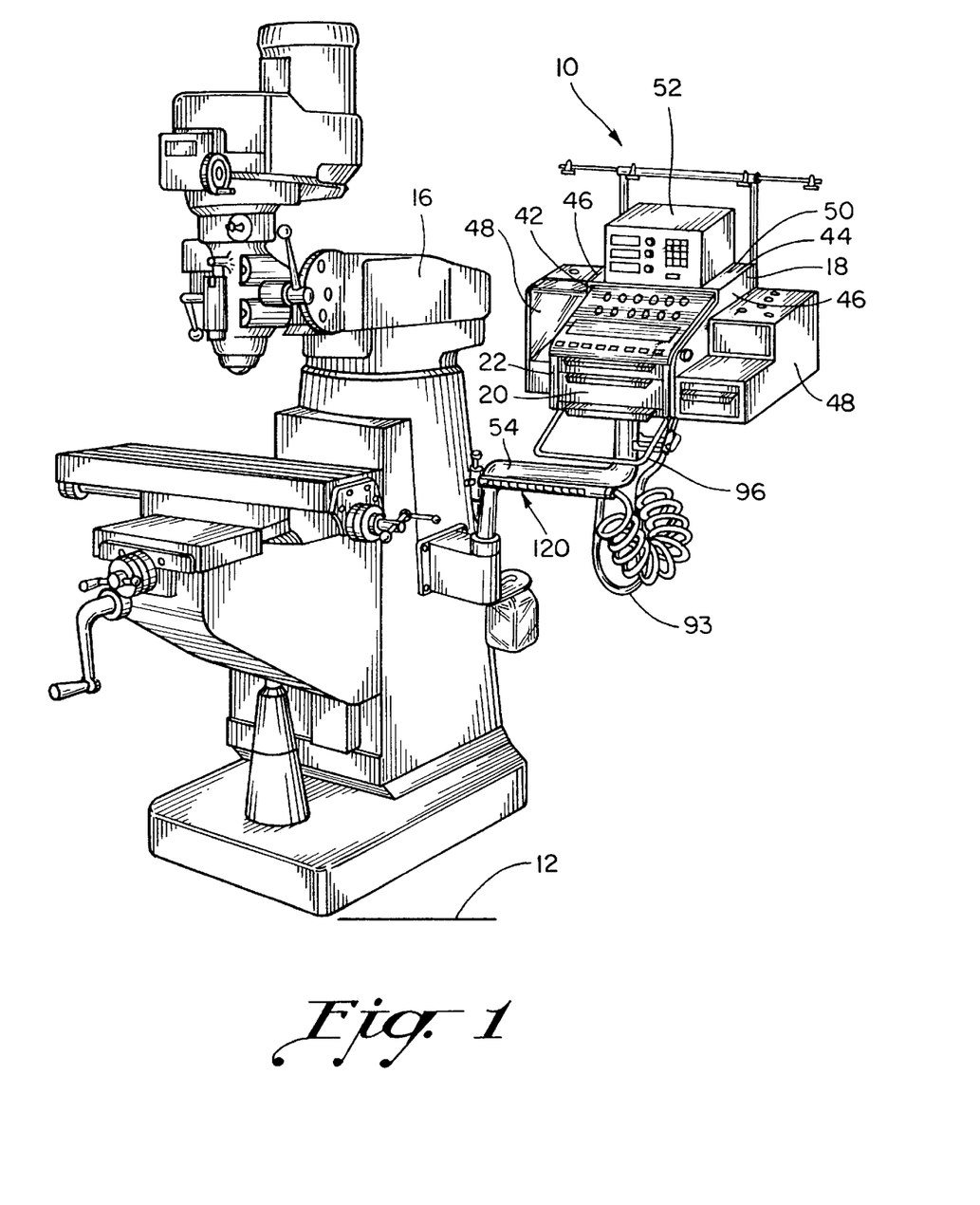
FIG. 1 is a perspective view of the present invention mounted to a machine tool.

Referring now to the drawings, a machine tool accessory apparatus 10 is illustrated in FIG. 1 for use with machine tools. The accessory apparatus 10 is sized and configured for holding and storing a plurality of tooling accessories or items such as collets, precision instruments, perishable and non perishable tooling, in an organized manner prolonging tool life and reducing tool inventory. Each accessory is thereby positioned for ready access by a machine tool operator without the operator having to move from an operating position or location of the machine tool indicated generally by the numeral 14.

The apparatus 10 provides at the operator's disposal all the necessary tooling accessories to expedite a wide variety of machine tool set-ups and operations commonly performed on a machine tool 16, such as milling machines. The apparatus 10 has been found to work especially well with Bridgeport type milling machines, as shown in FIG. 1.

Figure 5:
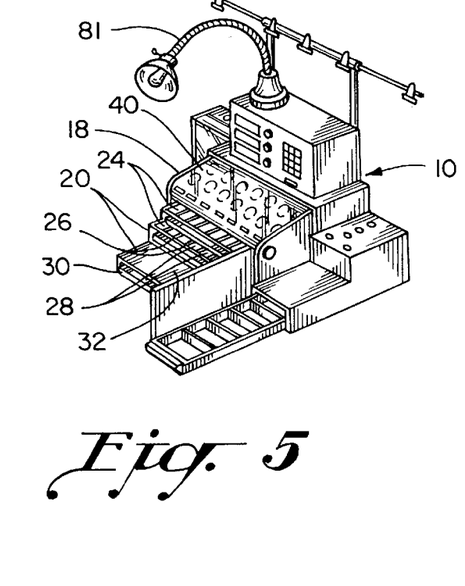
FIG. 5 is a perspective view of the present invention.

The apparatus 10 includes a cabinet structure 18 having a number of drawer structures 20 slidably extendible from a front side 22 of the cabinet structure 18. The drawer structures 20 are preferably rectangular in shape and define an interior compartment 24 (FIG. 5) therewithin that includes dividers 26 to form a plurality of individual compartments 28 to hold various tool accessories, such as end mills. The drawer structures 20 are slidably connected with the cabinet structure 18 in a conventional drawer rail manner. A bottommost drawer structure 30 has an upper surface or false bottom 32 adapted for supporting tools thereon in a tray like manner when outwardly extended in an open position from the cabinet structure 18, as shown in FIG. 5.

Figure 2:
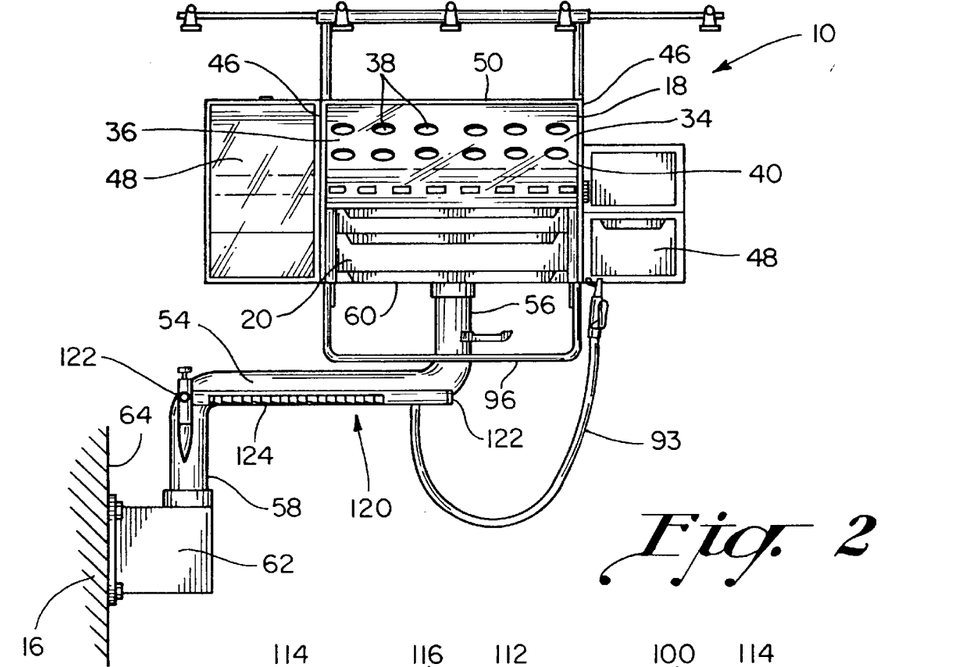
FIG. 2 is a front elevation view of the present invention.

Referring to FIG. 2, the cabinet structure 18 has an upper rack or tray 34 disposed across an upper front surface 36. The tray 34 has a plurality of bores 38 of adequate diameter for supporting tool accessories, such as collets therein. Preferably, the tray 34 is formed by a metal stamping or die cast manner and is located at the upper front surface 36 of the cabinet structure 18 to provide a convenient location and easy access to collets normally used in machine operation. An upper tray shield 40 is removably secured to the upper tray 34 for protecting the upper tray 34 and tooling within from debris, such as dust and metal chips. The shield 40 may be provided with tracks (not shown) to slide on and can be slid within a chamber 42 located an upper rear portion 44 of the cabinet structure 18, as best shown in FIG. 1.

The cabinet structure 18 has opposite sidewalls 46 vertically oriented and generally flat for attachment in confronting engagement with additional tool storage structures 48. The structures 48 may include tool racks and cabinets that are commercially available for use in machine shops as separate units that are commonly placed on a shelf or tool bench. The apparatus 10 allows a means to thereby customize the apparatus 10 to include additional racks based on particular machining needs. For example, the structure 48 disposed on the right side of the cabinet structure 18 is a drill index in one preferred embodiment.

Referring to FIG. 1, the cabinet structure 18 has a generally flat top surface 50 sized for supporting an electronic display device 52 of the machine tool 16 thereon. Milling machines 16 are now commonly equipped with display devices 52 that are mounted to a side of the machine 16. The top surface 50 of the apparatus 10 provides an efficient and convenient location for mounting the device 52.

Figure 3:
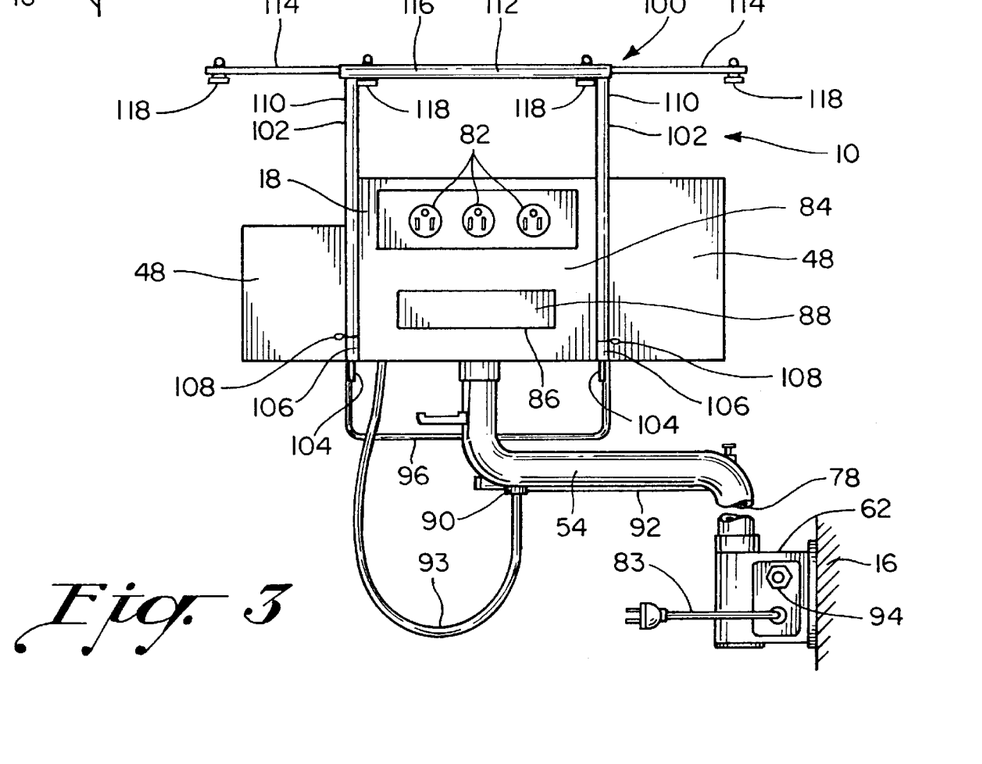
FIG. 3 is a rear elevation view of the present invention.
Figure 4:
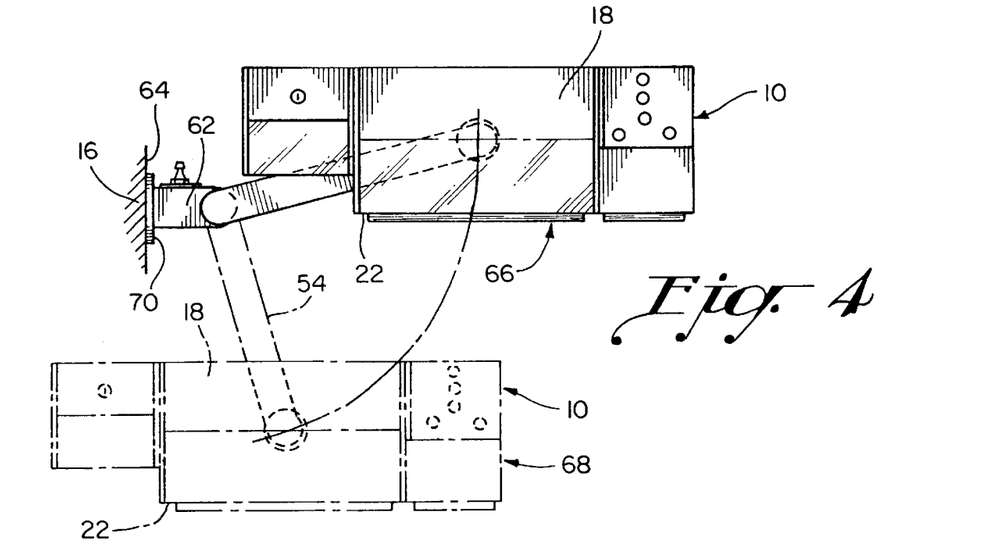
FIG. 4 is a top plan view of the present invention.

Referring to FIGS. 2–4, a swingable support arm 54 is provided having first and second ends 56,58. The first end 56 is pivotally mounted to a bottom portion 60 of the cabinet structure 18. The second end 58 is pivotally mounted to a mounting structure 62 adapted for mounting immediately adjacent to a sidewall 64 of the machine tool 16. The support arm 54 extends outwardly from the mounting structure 62 for cantilever positioning the cabinet structure 18 in a generally vertically and horizontally spaced apart relationship from the mounting structure 62. Preferably, the support arm 54 is generally S-shaped.

The cabinet structure 18 is movable on the support arm 54 from a first position 66 (FIG. 4) with the front side 22 of the cabinet structure 18 in vertical plane generally perpendicular to the sidewall 64 of the machine tool 16 to a second position 68 (FIG. 4) with the front side 22 of the cabinet structure 18 in a vertical plane forward of the first position allowing the cabinet structure 18 to be in close proximity to the machine tool operator located in the operating position of the machine tool 16. Preferably, the support arm 54 is swingable approximately 90° as shown in FIG. 4.

Figure 6:
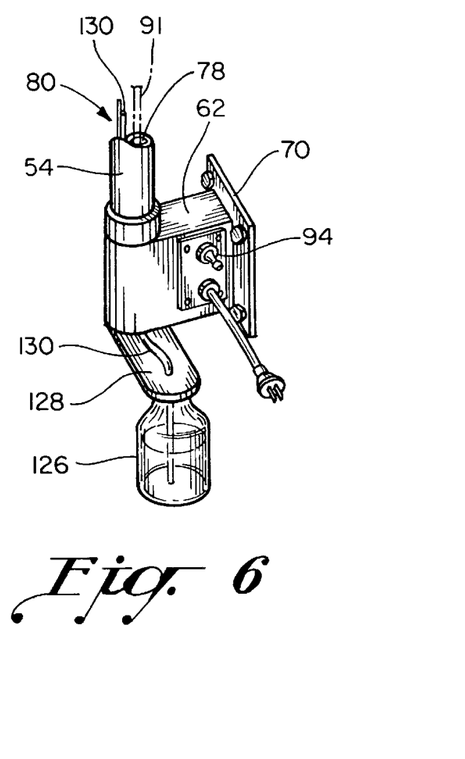
FIG. 6 is an enlarged perspective view of a mounting structure of a preferred embodiment of the present invention.
Figure 8:
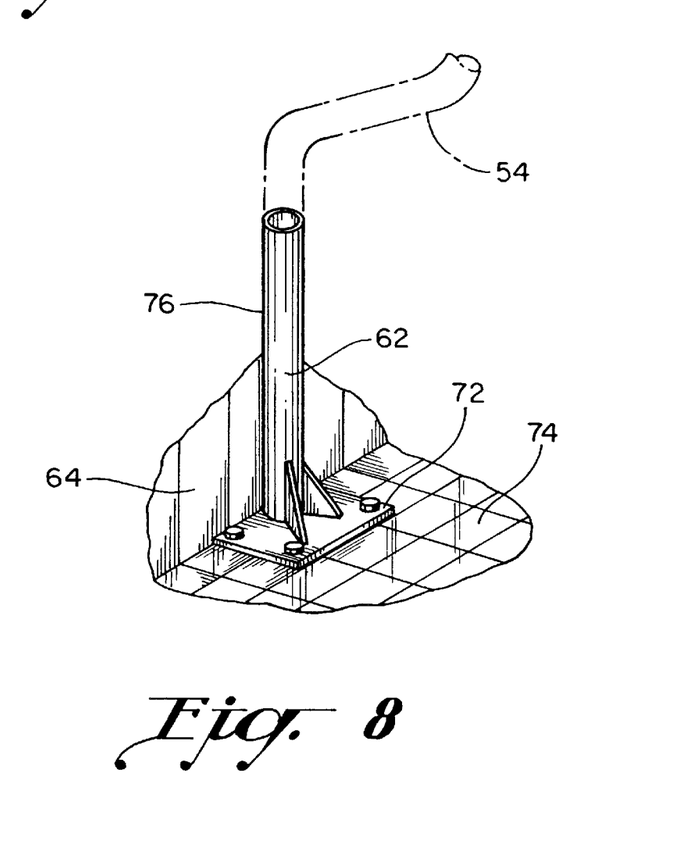
FIG. 8 is an enlarged perspective view of a mounting structure of an alternative embodiment of the present invention.

Referring to FIGS. 4 and 6, the mounting structure 62 of a preferred embodiment includes a vertically disposed bracket 70 adapted for attachment to the sidewall 64 of the machine tool 16. In an alternative embodiment shown in FIG. 8, the mounting structure 62 includes a horizontally disposed bracket 72 adapted for attachment to a floor 74 with a support arm receiving member 76 disposed immediately adjacent to the sidewall 64. It is also significant to note that while the mounting structure 62 is disposed adjacent to the sidewall 64 of the machine tool 16, the outwardly extending shape of the support arm 54 allows for easy access to the machine tool 16 for servicing and adjustment.

Referring to FIG. 3, the support arm 54 is hollow and has a chamber 78 extending therethrough. The chamber 78 is sized for extending access lines 80 (FIG. 6) therethrough which allow all of the access lines 80 typically about a machine tool, such as electrical lines or wires, air lines, fluid lines, and the like, to be consolidated and extend through a common junction. While this provides for organization and efficiency, it also provides an improved safety feature so that a machine operator is not subject to tripping or otherwise becoming tangled up with the access lines commonly lying about the floor and machine tool.

The electrical lines of the apparatus 10 also provide a centralized power source for accessory devices, such as a lamp 81 (FIG. 5) which can plug into electrical outlets 82 connected therewith provided on the back side 84 of the cabinet structure 18. A main power cord 83 is connected to central power source to provide power for the entire apparatus 10 and electrical devices connected therewith. The back side 84 may further include an opening 86 which leads to a chamber 88 sized for holding electrical cords. An air line adapter 90 is connected to an outer surface 92 of the support arm 54. The air line adapter 90 is operatively connected in communication with an air line 91 (FIG. 6) extending through the chamber 78 of the support arm 54. The air line 91 extends to in inlet adapter 94 (FIG. 6) which connects to a main air source (not shown). An air hose 93 connects with the adapter 90.

To facilitate easy movement of the apparatus between varied positions, a handle 96 is secured to the cabinet structure 18, as illustrated in FIG. 2. The handle 96 extends forwardly from the front side 22 of the cabinet structure 18 and is adapted for grasping by a hand of the machine operator to manually position the cabinet structure 18 between the first and second positions or other positions as needed, as previously described.

Referring to FIG. 3, a blue print holder 100 is provided to retain blue prints at the machine tool 16 at a convenient location yet keeping the prints relatively removed from oils, chips, and sprays resulting during machine tool operation. The holder 100 includes a pair of vertically extending first bar members 102. The first bar members 102 each have a first end 104 adjustably secured to the cabinet structure 18 by engaging a receiving member 106 having a removable pin 108 adjustably secured therethrough. A second end 110 of the members 102 extend upwardly from the cabinet structure 18 and connect with a horizontally extending second bar member 112. In a preferred embodiment, opposite ends 114 of the member 112 are telescoping into a main center portion 116 to allow for horizontal length adjustment. The second bar member 112 has a plurality of spring loaded clips 118 for removably securing a flexible sheet thereto.

Referring to FIG. 2, a tool mister device 120 including operating components of conventional design is operatively secured to the support arm 54. By mounting to the support arm 54, the tool mister device 120 is moveable to and from the operator at an arms reach to increase efficiency. Further the device 120 includes two pivot points 122, and a flexible end portion 124 to provide improved adjustability. The tool mister device 120 is operatively connected with a fluid tank 126 (FIG. 6) removably mounted to the mounting structure 62 with a bracket 128. A fluid tube 130 extends into the tank 126, through a portion of the support arm 54 and connects with the tool mister device 120.

Figure 7:
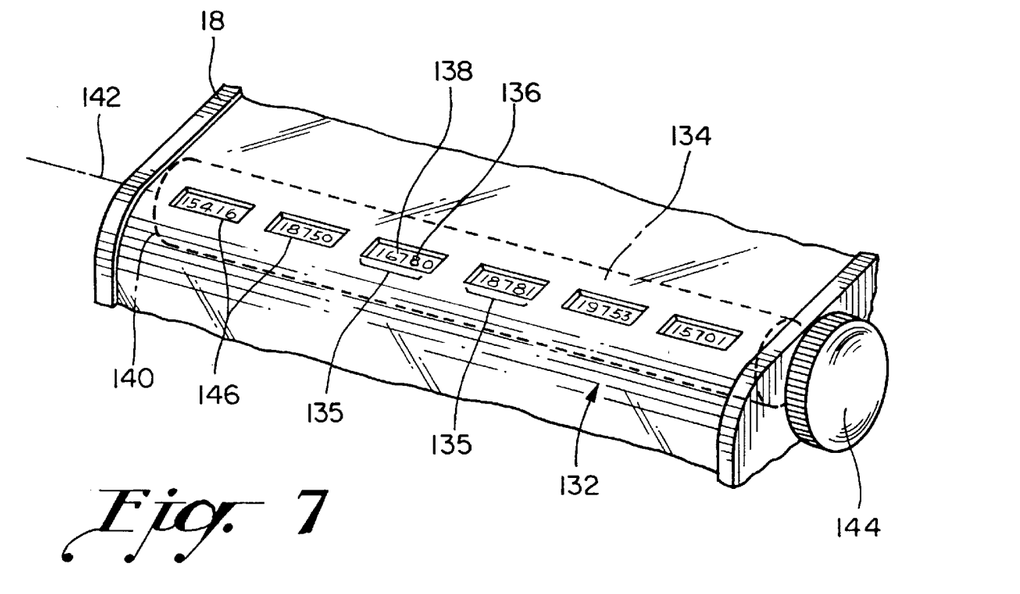
FIG. 7 is an enlarged perspective view of a index roller structure of the present invention.

Referring to FIG. 7, the apparatus 10 is provided with an information indicator 132. The indicator 132 includes a cylindrical roll 134 having indicia 136 printed on an outer surface 138 thereof. The cabinet structure 18 has an interior chamber 140 sized to contain the cylindrical roll 134 with the roll being rotatably mounted within the interior chamber 140. A longitudinal axis 142 of the cylindrical roll 134 lies in a horizontal plane for rotation therein. A knob member 144 is operatively connected to the cylindrical roll 134 for rotation by the machine tool operator. The cabinet structure 18 includes window apertures 146 adjacent to the cylindrical roll 134 housed within to expose selected portions of the cylindrical roll to provide specific information to the operator. In a preferred embodiment, the indicator 132 is a machine tool feed and speed indicator providing guidelines for proper S.F.M. which can result in prolonging tool life and increase the efficiency of the machines potential. In use, the operator lines up information printed on the roll 134 with information printed on a surface 135 of the cabinet structure 18 next to each respective window aperture 146.

Figure 9:
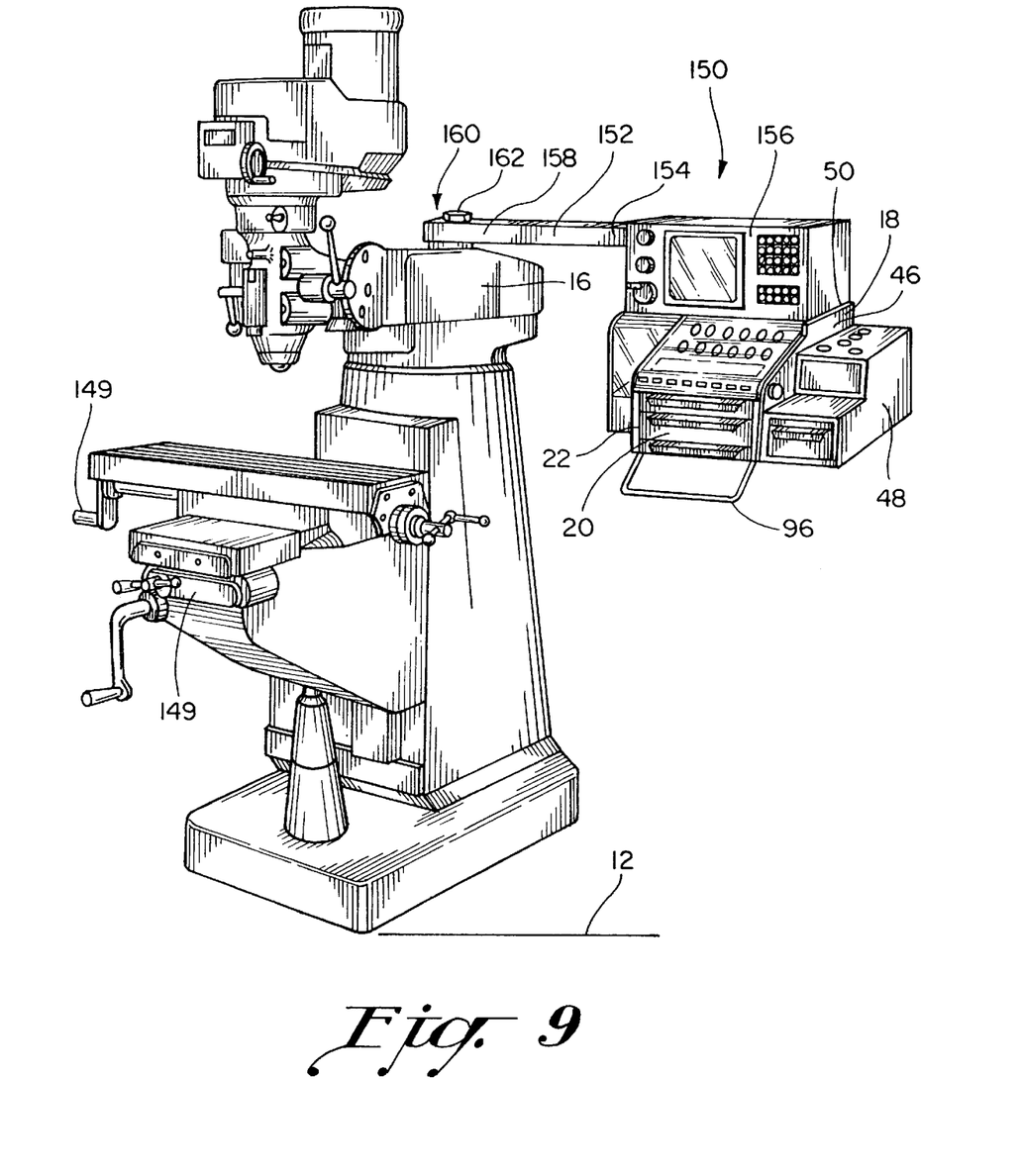
FIG. 9 is a perspective view of an alternative embodiment of the present invention mounted to a machine tool.

Referring to FIG. 9, an alternative embodiment of the machine tool accessory apparatus is indicted by the numeral 150 which is similar to the apparatus 10 as previously described except for most significantly the connection with swingable support arm 152 which replaces the previously described support arm 54. The support arm 152 has a first end 154 operatively connected with the cabinet structure 18 or the computerized controller unit 156 mounted to the top surface 50 of the cabinet structure 18 to suspend the cabinet structure 18 and unit 156 from the support arm 154 and for movement as previously described between first and second positions. A second end 158 of the support arm 152 is pivotally attached to the machine tool 16 with a mounting structure 160 including a pivot pin 162. The apparatus 150 is thereby mounted to the machine tool 16 in combination with the unit 156 which is of conventional design and provides computerized control of the machine tool 16 such operating various drive motors 149.

Although the invention has been described by reference to some embodiments it is not intended that the novel device be limited thereby, but that modifications thereof are intended to be included as falling within the broad scope and spirit of the foregoing disclosure, the following claims and the appended drawings.

I claim:

1. A machine tool accessory apparatus for use with machine tools, said accessory apparatus sized and configured for holding a plurality of tooling accessories in an organized manner whereby each accessory is positioned for ready access by a machine tool operator without the operator having to move from an operating position of the machine tool, the machine tool accessory apparatus comprising: a cabinet structure having at least one drawer structure slidably extendible from a front side of the cabinet structure, the cabinet structure including an upper tray having a plurality of bores in said upper tray of adequate diameter for supporting tool accessories therein and an upper tray shield removably secured to the upper tray for protecting the upper tray from debris, a support arm having first and second ends, the first end pivotally mounted to the cabinet structure, the second end pivotally mounted to a mounting structure adapted for mounting immediately adjacent to a sidewall of the machine tool, the support arm extending outwardly from the mounting structure for cantilever positioning the cabinet structure in a spaced apart relationship from the mounting structure, the cabinet structure being movable on the support arm from a first position with the front side of the cabinet structure in vertical plane generally perpendicular to the sidewall of the machine tool to a second position with the front side of the cabinet structure in a generally vertical plane forward of the first position allowing the cabinet structure to be in close proximity to the machine tool operator located in the operating position of the machine tool, and a handle secured to the cabinet structure, the handle extending forwardly from the front side of the cabinet structure and being adapted for grasping by a hand of the machine operator to manually position the cabinet structure between the first and second positions.

2. The machine tool accessory apparatus of claim 1, wherein the cabinet structure has a generally flat top surface sized for supporting an electronic display device of the machine tool thereon.

3. The machine tool accessory apparatus of claim 1, wherein the mounting structure includes a vertically disposed bracket adapted for attachment to the sidewall of the machine tool.

4. The machine tool accessory apparatus of claim 1, wherein the mounting structure includes a horizontally disposed bracket adapted for attachment to a floor and a support arm receiving member disposed immediately adjacent to the sidewall of the machine tool.

5. The machine tool accessory apparatus of claim 1, wherein the support arm has a chamber extending therethrough, the chamber being sized for extending access lines therethrough, the access lines including electrical lines for providing a centralized power source for accessory devices.

6. The machine tool accessory apparatus of claim 1, wherein the cabinet structure has at least two drawer structures, a bottommost drawer structure having an upper surface adapted for supporting tools thereon when outwardly extended in an open position from the cabinet structure.

7. The machine tool accessory apparatus of claim 1, further comprising at least one vertically extending first bar member, the first bar member having a first end adjustably secured to the cabinet structure and a second end extending upwardly from the cabinet structure and connected with a horizontally extending second bar member, the second bar member having clip means for removably securing a flexible sheet thereto.

8. The machine tool accessory apparatus of claim 1, wherein the support arm has a tool mister device operatively secured thereto, the tool mister device operatively connected with a fluid tank removably mounted to the apparatus.

9. The machine tool accessory apparatus of claim 1, further comprising a cylindrical roll having indicia printed on an outer surface thereof, the cabinet structure having an interior chamber sized to contain the cylindrical roll, the cylindrical roll being rotatably mounted within the interior chamber with a longitudinal axis of the cylindrical roll lying in a horizontal plane, a knob member operatively connected to the cylindrical roll for rotation by the machine tool operator, the cabinet structure having window apertures adjacent to the cylindrical roll to expose selected portions of the cylindrical roll.

10. A machine tool accessory apparatus for use with machine tools, said accessory apparatus sized and configured for holding a plurality of tooling accessories in an organized manner whereby each accessory is positioned for ready access by a machine tool operator without the operator having to move from an operating position of the machine tool, the machine tool accessory apparatus comprising: a cabinet structure having at least one drawer structure slidably extendible from a front side of the cabinet structure, the cabinet structure including an upper tray having a plurality of bores in said upper tray of adequate diameter for supporting tool accessories therein, an upper tray shield removably secured to the upper tray for protecting the upper tray from debris, the cabinet structure being in close proximity to the machine tool operator located in the operating position of the machine tool.

11. The machine tool accessory apparatus of claim 10, further comprising a handle secured to the cabinet structure, the handle extending forwardly from the front side of the cabinet structure and being adapted for grasping by a hand of the machine operator to manually position the cabinet structure between the first and second positions.

12. The machine tool accessory apparatus of claim 10, wherein the cabinet structure has opposite sidewalls vertically oriented and generally flat for attachment in confronting engagement with additional tool storage structures.

13. The machine tool accessory apparatus of claim 10, wherein the cabinet structure has a generally flat top surface sized for supporting an electronic display device of the machine tool thereon.

14. The machine tool accessory apparatus of claim 10, wherein the mounting structure includes a vertically disposed bracket adapted for attachment to the sidewall of the machine tool.

15. The machine tool accessory apparatus of claim 10, wherein the mounting structure includes a horizontally disposed bracket adapted for attachment to a floor and a support arm receiving member disposed immediately adjacent to the sidewall of the machine tool.

16. The machine tool accessory apparatus of claim 10, wherein the support arm has a chamber extending therethrough, chamber being sized for extending access lines therethrough.

17. The machine tool accessory apparatus of claim 16, wherein the access lines include electrical lines for providing a centralized power source for accessory devices.

18. The machine tool accessory apparatus of claim 10, wherein the cabinet structure has at least two drawer structures, a bottommost drawer structure having an upper surface adapted for supporting tools thereon when outwardly extended in an open position from the cabinet structure.

19. The machine tool accessory apparatus of claim 10, further comprising at least one vertically extending first bar member, the first bar member having a first end adjustably secured to the cabinet structure and a second end extending upwardly from the cabinet structure and connected with a horizontally extending second bar member, the second bar member having clip means for removably securing a flexible sheet thereto.

20. The machine tool accessory apparatus of claim 10, wherein the support arm has a tool mister device operatively secured thereto.

21. The machine tool accessory apparatus of claim 10, further comprising a chamber extending through the support arm and an air line adapter connected to an outer surface of the support arm, the air line adapter being operatively connected in communication with an air line extending through the chamber of the support arm.

22. The machine tool accessory apparatus of claim 10, further comprising a cylindrical roll having indicia printed on an outer surface thereof, the cabinet structure having an interior chamber sized to contain the cylindrical roll, the cylindrical roll being rotatably mounted within the interior chamber with a longitudinal axis of the cylindrical roll lying in a horizontal plane, a knob member operatively connected to the cylindrical roll for rotation by the machine tool operator, the cabinet structure having window apertures adjacent to the cylindrical roll to expose selected portions of the cylindrical roll.

23. A machine tool accessory apparatus for use with machine tools, comprising: a cabinet structure having at least one drawer structure slidably extendible from a front side of the cabinet structure, the cabinet structure including an upper tray having a plurality of bores in said upper tray of adequate diameter for supporting tool accessories therein and an upper tray shield removably secured to the upper tray for protecting the upper tray from debris, an S-shaped support arm having first and second ends, the first end pivotally mounted to a bottom of the cabinet structure, the second end pivotally mounted to a mounting structure adapted for mounting immediately adjacent to a sidewall of a machine tool, the support arm having a chamber extending therethrough, the chamber being sized for extending access lines therethrough, the support arm extending outwardly from the mounting structure for cantilever positioning the cabinet structure in a vertically and horizontally spaced apart relationship from the mounting structure, the cabinet structure being movable on the support arm approximately 90° from a first position with the front side of the cabinet structure in vertical plane generally perpendicular to the sidewall of the machine tool to a second position with the front side of the cabinet structure in a vertical plane forward of the first position, and a handle secured to the cabinet structure, the handle extending forwardly from the front side of the cabinet structure and being adapted for grasping by a hand of the machine operator to manually position the cabinet structure between the first and second positions.

24. The machine tool accessory apparatus of claim 23, wherein the cabinet structure has a generally flat top surface sized for supporting an electronic display device of the machine tool thereon.

25. The machine tool accessory apparatus of claim 24, wherein the cabinet structure has at least two drawer structures, a bottommost drawer structure having an upper surface adapted for supporting tools thereon when outwardly extended in an open position from the cabinet structure, the cabinet structure having opposite sidewalls vertically oriented and generally flat for attachment in confronting engagement with additional tool storage structures.

26. The machine tool accessory apparatus of claim 25, further comprising at least one vertically extending first bar member, the first bar member having a first end adjustably secured to the cabinet structure and a second end extending upwardly from the cabinet structure and connected with a horizontally extending second bar member, the second bar member having clip means for removably securing a flexible sheet thereto.

27. The machine tool accessory apparatus of claim 25, wherein the support arm has a tool mister device operatively secured thereto, the tool mister device operatively connected with a fluid tank removably mounted to the mounting structure.

28. The machine tool accessory apparatus of claim 27, further comprising a cylindrical roll having indicia printed on an outer surface thereof, the cabinet structure having an interior chamber sized to contain the cylindrical roll, the cylindrical roll being rotatably mounted within the interior chamber with a longitudinal axis of the cylindrical roll lying in a horizontal plane, a knob member operatively connected to the cylindrical roll for rotation by the machine tool operator, the cabinet structure having window apertures adjacent to the cylindrical roll to expose selected portions of the cylindrical roll.

29. A machine tool accessory apparatus for use with machine tools in combination with a computerized controller unit, said accessory apparatus sized and configured for holding a plurality of tooling accessories in an organized manner whereby each accessory is positioned for ready access by a machine tool operator without the operator having to move from an operating position of the machine tool, the machine tool accessory apparatus comprising: a cabinet structure having at least one drawer structure slidably extendible from a front side of the cabinet structure, the cabinet structure including an upper tray having a plurality of bores in said upper tray of adequate diameter for supporting tool accessories therein, the computerized controller unit being mounted to the cabinet structure, a support arm having first and second ends, the first end operatively mounted to the cabinet structure to suspend the cabinet structure and the computerized controller unit therefrom, the second end mounted to the machine tool, the support arm extending outwardly from the mounting structure for cantilever positioning the cabinet structure in a spaced apart relationship from the mounting structure.

30. The machine tool accessory apparatus of claim 29, wherein the support arm is pivotally mounted to the machine tool, the cabinet structure being movable on the support arm from a first position to a second position with the cabinet structure forward of the first position allowing the cabinet structure to be in close proximity to the machine tool operator located in the operating position of the machine tool.

31. The machine tool accessory apparatus of claim 30, further comprising a handle secured to the cabinet structure, the handle extending forwardly from the front side of the cabinet structure and being adapted for grasping by a hand of the machine operator to manually position the cabinet structure between the first and second positions.

32. A machine tool accessory apparatus for use with machine tools, said accessory apparatus sized and configured for holding a plurality of tooling accessories in an organized manner whereby each accessory is positioned for ready access by a machine tool operator without the operator having to move from an operating position of the machine tool, the machine tool accessory apparatus comprising: a cabinet structure having at least one drawer structure slidably extendible from a front side of the cabinet structure, the cabinet structure including an upper tray having a plurality of bores in said upper tray of adequate diameter for supporting tool accessories therein, a support arm having first and second ends, the first end pivotally mounted to the cabinet structure, the second end pivotally mounted to a mounting structure adapted for mounting immediately adjacent to a sidewall of the machine tool, the support arm extending outwardly from the mounting structure for cantilever positioning the cabinet structure in a spaced apart relationship from the mounting structure, the cabinet structure being movable on the support arm from a first position to a second position with the front side of the cabinet structure in a generally vertical plane forward of the first position allowing the cabinet structure to be in close proximity to the machine tool operator located in the operating position of the machine tool, and wherein the mounting structure further includes a vertically disposed bracket adapted for attachment to the sidewall of the machine tool.

33. A machine tool accessory apparatus for use with machine tools, said accessory apparatus sized and configured for holding a plurality of tooling accessories in an organized manner whereby each accessory is positioned for ready access by a machine tool operator without the operator having to move from an operating position of the machine tool, the machine tool accessory apparatus comprising: a cabinet structure having at least one drawer structure slidably extendible from a front side of the cabinet structure, the cabinet structure including an upper tray having a plurality of bores in said upper tray of adequate diameter for supporting tool accessories therein, a support arm having first and second ends, the first end pivotally mounted to the cabinet structure, the second end pivotally mounted to a mounting structure adapted for mounting immediately adjacent to a sidewall of the machine tool, the support arm extending outwardly from the mounting structure for cantilever positioning the cabinet structure in a spaced apart relationship from the mounting structure, the cabinet structure being movable on the support arm from a first position to a second position with the front side of the cabinet structure in a generally vertical plane forward of the first position allowing the cabinet structure to be in close proximity to the machine tool operator located in the operating position of the machine tool, and wherein the mounting structure further includes a horizontally disposed bracket adapted for attachment to a floor and a support arm receiving member disposed immediately adjacent to the sidewall of the machine tool.

34. A machine tool accessory apparatus for use with machine tools, said accessory apparatus sized and configured for holding a plurality of tooling accessories in an organized manner whereby each accessory is positioned for ready access by a machine tool operator without the operator having to move from an operating position of the machine tool, the machine tool accessory apparatus comprising: a cabinet structure having at least one drawer structure slidably extendible from a front side of the cabinet structure, the cabinet structure including an upper tray having a plurality of bores in said upper tray of adequate diameter for supporting tool accessories therein, a support arm having first and second ends, the first end pivotally mounted to the cabinet structure, the second end pivotally mounted to a mounting structure adapted for mounting immediately adjacent to a sidewall of the machine tool, the support arm extending outwardly from the mounting structure for cantilever positioning the cabinet structure in a spaced apart relationship from the mounting structure, the cabinet structure being movable on the support arm from a first position to a second position with the front side of the cabinet structure in a generally vertical plane forward of the first position allowing the cabinet structure to be in close proximity to the machine tool operator located in the operating position of the machine tool, and further wherein the support arm has a tool mister device operatively secured thereto.

35. A machine tool accessory apparatus for use with machine tools, said accessory apparatus sized and configured for holding a plurality of tooling accessories in an organized manner whereby each accessory is positioned for ready access by a machine tool operator without the operator having to move from an operating position of the machine tool, the machine tool accessory apparatus comprising: a cabinet structure having at least one drawer structure slidably extendible from a front side of the cabinet structure, the cabinet structure including an upper tray having a plurality of bores in said upper tray of adequate diameter for supporting tool accessories therein, a support arm having first and second ends, the first end pivotally mounted to the cabinet structure, the second end pivotally mounted to a mounting structure adapted for mounting immediately adjacent to a sidewall of the machine tool, the support arm extending outwardly from the mounting structure for cantilever positioning the cabinet structure in a spaced apart relationship from the mounting structure, the cabinet structure being movable on the support arm from a first position to a second position with the front side of the cabinet structure in a generally vertical plane forward of the first position allowing the cabinet structure to be in close proximity to the machine tool operator located in the operating position of the machine tool, and further comprising a cylindrical roll having indicia printed on an outer surface thereof, the cabinet structure having an interior chamber sized to contain the cylindrical roll, the cylindrical roll being rotatably mounted within the interior chamber with a longitudinal axis of the cylindrical roll lying on a horizontal plane, a knob member operatively connected to the cylindrical roll for rotation by the machine tool operator, the cabinet structure having window apertures adjacent the cylindrical roll to expose selected portions of the cylindrical roll.

36. A cabinet structure for housing machine tool accessories, having at least an upper compartment and a lower compartment wherein the lower compartment is comprised of an upper surface, a lower surface, and at least one drawer, and wherein said upper compartment is comprised of a plate having multiple bores sized for receiving machine tools therein, said upper compartment further comprising a removable covering for said plate wherein said removable covering extends over said plate so as to protect the plate from environmental debris, said lower compartment having mounting means extending therefrom, said lower compartment rotatably supporting a cylindrical roll, said cylindrical roll having indicia printed on an outer surface thereof and a knob extending therefrom to provide a means for rotating the cylindrical roll within said lower compartment.

37. The cabinet structure of claim 36 wherein said mounting means comprises an upper bracket, a lower bracket and a post, said upper bracket attached to said cabinet structure so as to extend from said lower compartment and having an opening for receiving said post, said post being elongate and having first and second ends which are opposed, wherein said first end is inserted in said opening of said upper bracket, and wherein said lower bracket comprises an opening for receiving said second end of said post and wherein said second end is inserted in said opening of said lower bracket, said lower bracket having a broad flange opposed to said opening is said lower bracket, said broad flange proving means for attachment to a stable surface.

38. The cabinet structure of claim 37 wherein the upper and lower brackets include pivoting means.

39. The cabinet structure of claim 37 or 38 wherein the post is curved.

40. A machine tool accessory organizer comprising a housing and a support means, said housing comprising an upper unit and a lower unit, said lower unit including at least one drawer, said upper unit providing organizing means and protection means for machine tools, said lower unit further comprising a compartment which rotatably supports a cylindrical roll, said compartment having apertures therein for viewing said cylindrical roll, and wherein said support means holds the organizer in close proximity to a machine tool and is selected from the group comprised of a support base, a post, and a pivoting arm.

\* \* \* \* \*